June 23, 1942. W. C. KLINGELHOEFER 2,287,555
PRODUCTION OF SULPHUR MONOCHLORIDE
Filed Jan. 5, 1939
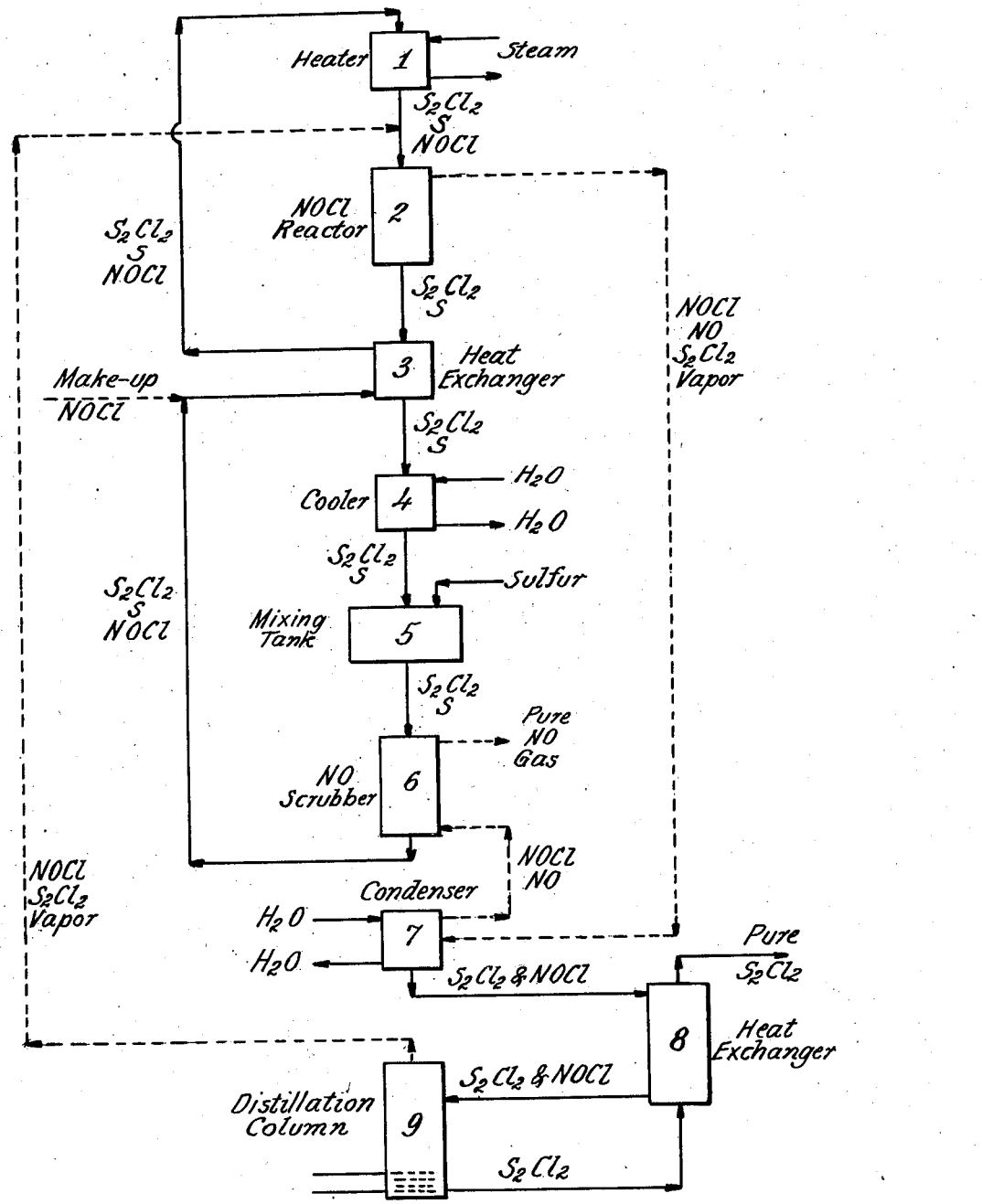
INVENTOR
William C. Klingelhoefer
BY
Benjamin Sweedler
ATTORNEY Patented June 23, 1942

2,287,555

UNITED STATES PATENT OFFICE 2,287,555

PRODUCTION OF SULPHUR MONOCHLORIDE

William C. Klingelhoefer, Syracuse, N. Y., assignor to The Solvay Process Company, New York, N. Y., a corporation of New York Application January 5, 1939, Serial No. 249,420

9 Claims. (Cl. 23—205)

This invention relates to the production of sulphur monochloride.

It has been proposed to produce sulphur monochloride by chlorinating sulphur and sulphur-sulphur monochloride solutions with free chlorine; this chlorination reaction is exothermic and in practice has been found difficult to control. Furthermore, the use of free chlorine as the chlorinating agent results in production of higher chlorides of sulphur, the presence of an excess of chlorine in the vapors leaving the reactor invariably resulting in formation of a sulphur monochloride-sulphur dichloride product. Hence, it is difficult to carry out this chlorination reaction so as to obtain as the final product sulphur monochloride substantially free of higher chlorinated products. Formation of sulphur monochloride and nitric oxide by treating nitrosyl chloride with sulphur alone has also been suggested. In order for this reaction to be carried out at a reasonably rapid rate for commercial production it is necessary to operate at temperatures far above the melting point of the sulphur, e. g. at temperatures above 200° C. Operating at these high temperatures introduces difficulties in material handling and renders the process costly from the viewpoint of necessary heat required to carry out the reaction. Furthermore, sulphur monochloride vapor leaving the reactor at these temperatures contains a considerable quantity of sulphur vapor, resulting in production of an impure sulphur monochloride product.

It is an object of this invention to provide a process for producing sulphur monochloride substantially free from higher chlorides of sulphur, which process involves a chlorination reaction that can readily be controlled and carried out at relatively low temperatures to produce the desired product. Other objects and advantages will appear from the following detailed description of the invention.

I have discovered substantially pure sulphur monochloride may be readily and effectively produced by reacting nitrosyl chloride with sulphur dissolved in sulphur monochloride. This reaction is endothermic and can be easily controlled. Nitrosyl chloride, I have found, is soluble in sulphur monchloride and in sulphur-sulphur monochloride solutions; hence, the reaction may be carried out in the liquid phase, probably resulting in an increased rate of reaction as compared with the rate of reaction between nitrosyl chloride and sulphur alone. Further, because of the solubility of nitrosyl chloride in sulphur monochloride or sulphur-sulphur monochloride solutions, such liquids may, in accordance with this invention, be used to separate unreacted nitrosyl chloride from the nitric oxide formed as a gaseous reaction product, the solution of NOCl in sulphur monochloride thus produced being returned to the reactor for reaction of the NOCl contained therein with dissolved sulphur to produce further amounts of sulphur monochloride.

In addition to ease of control of the reaction the use of nitrosyl chloride has the further advantage over chlorine as a chlorinating agent for the sulphur-sulphur monochloride solution that the nitric oxide gas liberated in the reaction acts as a carrier for sulphur monochloride vapor and thus permits vaporization of sulphur monochloride as formed, at lower temperatures or lower concentrations of sulphur monochloride in the solution. Further, I have found the presence of nitrosyl chloride in the gaseous reaction product comprising nitric oxide and sulphur monochloride vapor does not result in appreciable formation of higher chlorinated compounds of sulphur even when the amount of nitrosyl chloride is equivalent to 25% of the nitric oxide present in the gas mixture. This may be attributed in part to the nitric oxide present in the vapors leaving the reactor which tends to reduce to sulphur monochloride any higher chlorinated products formed.

I have further discovered the reaction between sulphur-sulphur monochloride solution and nitrosyl chloride may be accelerated by use of catalysts such as FeCl₃, SbCl₃, AlCl₃, HgCl₂, BiCl₃ or I₂. Such catalysts as are soluble in the sulphur-sulphur monochloride solutions, e. g., FeCl₃, can effectively be used by dissolving them in sulphur-sulphur monochloride solution, thus facilitating the carrying out of the reaction.

In carrying out the process of my invention, nitrosyl chloride is brought into contact with a solution of sulphur in sulphur monochloride, preferably containing 10% to 30% by weight of elemental sulphur (5.5 to 18.4 mol % S₈), whereupon a reaction takes place according to the following equation:

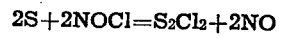

The process is carried out at a temperature in the range 25° to 135° C., preferably about 100° C. and preferably at a pressure of about 1 to 1½ atmospheres. The operation of the process may be made continuous, for example, by passing the gas and liquid in countercurrent or cocurrent relation through a packed tower or bubble-cap column. High yields of sulphur monochloride, based on entering nitrosyl chloride, may be obtained in both a packed tower and a bubble-cap column; for example, in a packed tower conversions of more than 80% of the nitrosyl chloride to sulphur monochloride and nitric oxide were obtained at temperatures in the range 80°–100° C. and with concentrations of 13 (7.3 mol % $S_8$) to 30% (18.4 mol % $S_8$) sulphur in the sulphur-sulphur monochloride solution. With a bubble-cap column, yields of $S_2Cl_2$ and NO in the range 77% to 83% based on entering NOCl were obtained with sulphur concentrations of 15% (8.4 mol % $S_8$) to 23% (13.6 mol % $S_8$) and temperatures of 72° to 85° C. Conversion of NOCl to $S_2Cl_2$ and NO under equilibrium conditions at these temperatures and concentrations amounts to about 86%.

Agitation of a reaction mixture of sulphur-sulphur monochloride solution and nitrosyl chloride gas has been found effective to increase the conversion, especially at lower temperatures; for example, at 50° C. agitation of the reaction mixture raised the conversion from 48% to 70%. The effect of agitation is probably to keep the sulphur-sulphur monochloride solution saturated with NOCl at all times. Therefore, because of the greater solubility of NOCl in sulphur monochloride at low temperatures, high conversions of NOCl to $S_2Cl_2$ and NO are obtained at relatively low temperatures, the desired reaction taking place in the liquid phase between sulphur and NOCl dissolved in the sulphur monochloride.

In the production of sulphur monochloride and nitric oxide by reaction of nitrosyl chloride with sulphur dissolved in sulphur monochloride, the extent of conversion of NOCl to $S_2Cl_2$ under equilibrium conditions has been found to increase with increase in sulphur concentration. Under conditions of operation, however, the rate of reaction is lowered at the higher sulphur concentrations, probably because of the increase in viscosity of sulphur-sulphur monochloride solutions containing high sulphur concentrations and the resulting difficulty in bringing about satisfactory contact between the solution and the nitrosyl chloride gas. It has been found advantageous, therefore, to use a solution containing sulphur in the range of about 10% to 30% by weight, or between 5.5 and 18.4 mol % $S_8$. Such solutions, it will be noted, contain a minor molar proportion of sulphur; it is to be understood the term "minor molar proportion of sulphur" is used in the specification and claims to indicate the solution of sulphur in sulphur monochloride referred to contains less than 50 mol % sulphur. In this range of concentrations there is obtained maximum conversion of NOCl to $S_2Cl_2$ and NO under conditions of temperature and pressure stated above.

It is desirable to operate at a temperature such that sulphur monochloride is volatilized from the reaction mixture at substantially the same rate as sulphur monochloride is formed, since separation of sulphur monochloride by means other than vaporization presents difficulties in operation. In my process volatilization of sulphur monochloride from the reaction mixture is greatly facilitated by evolution of gaseous nitric oxide formed in the reaction, and, therefore, operation of the process in such a manner that $S_2Cl_2$ is volatilized substantially at the rate it is formed may be carried out at a relatively low temperature, i. e., about 100° C., with a corresponding saving in the heat input for the process over operation at a higher temperature, since the required heat can be added more economically at about 100° C. Moreover, a temperature in the neighborhood of 100° C. has been found an optimum temperature for operation, since sulphur-sulphur monochloride solution may be conveniently handled and contacted with nitrosyl chloride gas in continuous operation at this temperature.

Heat may be supplied for the endothermic reaction by provision of heating apparatus in the reaction zone or by preheating the sulphur-sulphur monochloride solution to be reacted with the nitrosyl chloride.

It has been found somewhat greater conversion efficiency of nitrosyl chloride to sulphur monochloride and nitric oxide is obtained at pressures slightly above atmospheric, under the conditions of operation stated above. The rate of reaction between nitrosyl chloride and sulphur dissolved in sulphur monochloride is proportional approximately to the square of the NOCl driving force (the partial pressure of NOCl under conditions of operation minus the partial pressure of NOCl when the reaction has reached equilibrium). A pressure of about 1½ atmospheres has been found advantageous in the operation of my process, particularly when the nitrosyl chloride is accompanied by a substantial proportion of diluent gas. The process of this invention is applicable to gas mixtures consisting essentially of NOCl, such mixtures being obtained in the processing of the gaseous product resulting from the reaction between nitric acid and metal chlorides.

Ferric chloride is the preferred catalyst under the conditions of operation outlined above. Though the solubility of ferric chloride in sulphur monochloride is quite low (less than .5% at 100° C.), only a small amount (.1% $FeCl_3$ by weight) is needed to give full catalytic activity. I have found the presence of ferric chloride increases the rate of reaction about 18 times at 100° C. The metal chloride catalyst may be dissolved as such in the sulphur monochloride or the free metal or one of its compounds may be added to the reaction mixture. For example, metallic antimony or iron filings or iron pyrites may be added to give the corresponding metal chloride by reaction with sulphur monochloride.

Nitric oxide gas evolved from the reaction mixture, usually accompanied by unreacted nitrosyl chloride and sulphur monochloride vapor, may be cooled to condense sulphur monochloride, and the uncondensed gases may be freed from residual nitrosyl chloride and sulphur monochloride by scrubbing, sulphur monochloride or sulphur-sulphur monochloride solution preferably being used as the scrubbing liquor. An aqueous liquid such as water or zinc chloride solution may be used to scrub the gas, but the use of sulphur monochloride has the advantage of recovering the residual NOCl in a form in which it may be directly reintroduced into the reactor. The solubility of NOCl in cold sulphur monochloride is sufficiently high (7.2 mol % NOCl absorbed by $S_2Cl_2$ at 30° C. under one atmosphere total pressure) to remove the residual nitrosyl chloride and obtain relatively pure nitric oxide gas. If nitric oxide of greater purity is desired, it may be washed further with an alkaline solution, e. g., sodium carbonate solution. The absorbed NOCl may be expelled from the sulphur monochloride absorption liquor by heating it to a temperature of 135° to 140° C. at atmospheric pressure.

Sulphur monochloride formed by reactions of sulphur and nitrosyl chloride may be reacted with carbon bisulphide as illustrated by the following equation:

$$CS_2 + 2S_2Cl_2 = CCl_4 + 6S$$

The reaction is preferably carried out in a packed column by passing sulphur monochloride countercurrent to carbon bisulphide vapor. Pure carbon tetrachloride is separated from the vapors evolved during the reaction and unreacted carbon bisulphide returned to the reaction. The sulphur formed in the reaction between carbon bisulphide and sulphur monochloride is usually removed as a solution of sulphur in unreacted sulphur monochloride and may be used in that form to react with nitrosyl chloride. Sulphur formed in the reaction may also be separated from the reaction mixture and converted into carbon bisulphide by reaction with charcoal in an electric furnace. The process may be so regulated that the amounts of carbon tetrachloride and sulphur monochloride produced will vary as desired, i. e., either carbon tetrachloride or sulphur monochloride may be produced as the sole product, or both carbon tetrachloride and sulphur monochloride obtained as products.

Nitric oxide formed by the reaction of sulphur and nitrosyl chloride may, together with ammonia oxidation products, be reacted with water and oxygen or air to produce nitric acid for use in the reaction between salt and nitric acid, whereby nitrosyl chloride, chlorine, and sodium nitrate are obtained as products. Thus, with ammonia, salt, sulphur, and charcoal as raw materials, there may be obtained sodium nitrate, nitric acid, chlorine, nitrosyl chloride, sulfur monochloride, carbon tetrachloride and carbon bisulphide as products.

In the drawing accompanying this specification there is illustrated diagrammatically a continuous process for production of nitric oxide and sulphur monochloride from nitrosyl chloride and sulphur.

Reference numeral 1 indicates a steam-jacketed tubular heater through which are passed the entering reactants, NOCl gas and sulphur-sulphur monochloride solution containing some dissolved NOCl and a small amount of ferric chloride catalyst. The reaction is carried out in the NOCl reactor 2, preferably a bubble-cap column or packed tower. The liquid effluent from the reactor, constituted of sulphur monochloride containing unreacted sulphur in solution, is passed through the heat exchanger 3 where it serves to preheat the reactants about to enter heater 1. The liquid from the reactor 2 is cooled further in an auxiliary cooler 4 and is then passed to the mixing tank 5 where sulphur entering the process is dissolved therein. The cold sulphur-sulphur monochloride solution from tank 5 is passed to a gas scrubber 6, preferably in the form of a bubble-cap column or packed tower, where it serves to scrub a gaseous mixture of NO and NOCl, absorbing the NOCl therefrom. The scrubbing liquor, now consisting of sulphur monochloride containing sulphur and a small amount of NOCl in solution, is passed into heat exchanger 3 along with the make-up NOCl entering the process, and there the mixture is preliminarily heated before passing to the heater 1.

The gaseous reaction product from the reactor 2 is cooled and partially condensed in the water-cooled tubular condenser 7 to separate it into a liquid fraction consisting essentially of sulphur monochloride and a gas fraction essentially nitric oxide, both containing NOCl as an impurity. The gas fraction, comprising nitric oxide containing NOCl as an impurity is passed through the scrubber 6 and there scrubbed with cold sulphur-sulphur monochloride solution from the mixing tank 5 to remove NOCl from the gas and produce substantially pure nitric oxide. The condensate from condenser 7 is preliminarily heated in the heat exchanger 8 and then rectified in the distillation column 9 to obtain pure sulphur monochloride which serves to heat the above mentioned condensate in the heat exchanger 8 before being withdrawn from the process. Vapors from the distillation column 9 are returned to the NOCl reactor 2.

In the following example of a continuous process for carrying out applicant's invention according to the flow diagram shown in the drawing, all quantities of materials entering and leaving each stage of the process are based on 100 lb.-mols of NOCl entering the process as make-up NOCl.

A S—S₂Cl₂—NOCl solution containing FeCl₃ as a catalyst, and NOCl gas in the following proportions:

| | Lb.-mols |
|---|---|
| NOCl gas | 100 |
| NOCl in solution | 26.8 |
| S₈ in solution | 121.6 |
| S₂Cl₂ | 971.2 |

(Fe=0.2 wt. % of solution)

were passed through heater 1. During the heating process the vapor phase of the mixture became saturated with S₂Cl₂ and some NOCl gas dissolved in the solution. The mixture was heated to a temperature of about 100° C. in the heater 1.

The liquid and vapor leaving heater 1 were passed cocurrently into the NOCl reactor 2 at atmospheric pressure. 3 lb.-mols NOCl and 1.6 lb.-mols S₂Cl₂ vapor from still 9 also entered the reactor 2. In reactor 2 nitrosyl chloride and sulphur reacted to form sulphur monochloride and nitric oxide, 75% of the entering NOCl being converted to NO. The heat absorbed by the endothermic reaction lowered the temperature of the mixture to about 98° C. The nitric oxide and most of the unreacted nitrosyl chloride passed off as a gas accompanied by sulphur monochloride vapor in the following proportions:

| | Lb.-mols |
|---|---|
| NO | 97.3 |
| NOCl | 26.9 |
| S₂Cl₂ | 50.6 |

The liquid leaving the reactor 2 having a composition:

| | Lb.-mols |
|---|---|
| NOCl | 5.6 |
| S₈ | 109.4 |
| S₂Cl₂ | 970.8 | was partially cooled in heat exchanger 3 by the mixture of sulphur-sulphur monochloride solution and nitrosyl chloride gas about to enter heater 1.

The cooled sulphur-sulphur monochloride solution leaving heat exchanger 3 was further cooled to about 25° C. in auxiliary cooler 4 and then introduced into mixing tank 5, where 12.2 lb.-mols of sulphur (S₈) were dissolved in said solution. The heat required to dissolve the sulphur lowered the temperature of the solution about 1° C. The solution was then passed in countercurrent relation to a gaseous mixture of nitric oxide and nitrosyl chloride in NO scrubber 6 at atmospheric pressure, whereupon the liquid absorbed the greater part of the nitrosyl chloride from the gas. The materials entering and leaving the NO scrubber were as follows:

| Material | Entering | | Leaving | |
|---|---|---|---|---|
| | Gas | Liquid | Gas | Liquid |
| NO | 97.3 | | 97.3 | |
| NOCl | 23.7 | 5.6 | 2.5 | 26.8 |
| S₈ | | 121.6 | | 121.6 |
| S₂Cl₂ | 2.3 | 970.8 | 1.9 | 971.2 |

The liquid leaving scrubber 6 at a temperature of about 28° C., together with 100 mols make-up nitrosyl chloride entering the process was preliminarily heated in heat exchanger 3 before passing to the heater 1.

Vapor evolved in reactor 2 comprising nitric oxide, nitrosyl chloride and sulphur monochloride entered condenser 7 where most of the sulphur monochloride was condensed and a gas consisting of nitric oxide, nitrosyl chloride, and a little sulphur monochloride vapor left the condenser at a temperature of about 25° C. The material balance for condenser 7 was as follows:

| Material | Entering gas | Leaving | |
|---|---|---|---|
| | | Gas | Liquid |
| NO | 97.3 | 97.3 | |
| NOCl | 26.9 | 23.7 | 3.2 |
| S₂Cl₂ | 50.6 | 2.3 | 48.3 |

The gas leaving condenser 7 was passed countercurrent to a sulphur-sulphur monochloride solution in the scrubber 6, as described above, whereby nitrosyl chloride was removed and nitric oxide gas containing about 95.8% NO was produced.

Sulphur monochloride condensate from condenser 7 containing absorbed nitrosyl chloride was preliminarily heated in heat exchanger 8 and then rectified in distillation column 9 to remove nitrosyl chloride contained therein. The nitrosyl chloride, together with a small amount of sulphur monochloride vapor, leaving the column at a temperature of about 100° C., was returned to reactor 2. Hot sulphur monochloride liquid withdrawn from column 9 was utilized to heat entering solution in heat exchanger 8 and then withdrawn as a product.

In the continuous process described, the FeCl₃ catalyst was circulated with the sulphur-sulphur monochloride solution through the heater 1, NOCl reactor 2, heat exchanger 3, cooler 4, mixing tank 5, NO scrubber 6, and back through heat exchanger 3 to heater 1. Iron turnings were added as needed to maintain the proper concentration of catalyst.

The ratio of NOCl to the amount of solution fed to the reactor may be varied over a wide range from excess NOCl to excess S—S₂Cl₂ solution. The use of two to twenty times the amount of S—S₂Cl₂ solution actually required to react with the NOCl appears desirable in order to obtain good conversions and absorption of the NOCl and to obtain a pure sulphur monochloride product.

Nickel, Monel metal, ceramic ware and Dow Metal F (95.7% Mg, 4% Al, .3% Mn) have all been found satisfactory materials of construction from the corrosion standpoint for handling sulphur monochloride solutions, either hot or cold, in the presence of NOCl. Both lead and chrome iron (preferably 18% to 28% Cr) have been found satisfactory for handling hot sulphur monochloride in the absence of NOCl. Iron may be used for handling cold sulphur monochloride when no NOCl is present. For example, the column in which NOCl is contacted with sulphur-sulphur monochloride solution may be constructed of nickel, Monel metal, or Dow Metal F and may be packed with ceramic rings.

It will be understood the process herein disclosed may be carried out either in batch or continuous operation.

I claim:

1. A continuous process for the production of sulphur monochloride which comprises continuously introducing nitrosyl chloride into contact with a reactant comprising a solution of sulphur in sulphur monochloride said reactant containing about 10% to 30% elemental sulphur and about 90% to 70% sulphur monochloride by weight, reacting said nitrosyl chloride with the dissolved sulphur at a temperature of about 100° C. to form a gaseous product comprising nitric oxide and an amount of sulphur monochloride vapor substantially equivalent to the sulphur monochloride formed in the reaction, continuously withdrawing said gaseous product and cooling it to condense sulphur monochloride therefrom.

2. The process which comprises reacting nitrosyl chloride with sulphur dissolved in sulphur monochloride in the presence of a catalyst from the group consisting of ferric chloride, antimony trichloride, mercuric chloride, bismuth chloride, aluminum chloride and iodine.

3. The process for production of sulphur monochloride and nitric oxide which comprises bringing nitrosyl chloride into contact with a solution of sulphur in sulphur monochloride containing 10% to 30% elemental sulphur by weight, and reacting said nitrosyl chloride with the dissolved sulphur at a temperature of about 100° C. in the presence of ferric chloride.

4. A continuous process for the production of sulphur monochloride and nitric oxide which comprises continuously introducing nitrosyl chloride into contact with a solution of sulphur in sulphur monochloride containing about 10% to 30% elemental sulphur by weight, reacting said nitrosyl chloride with the dissolved sulphur at a temperature of about 100° C. to form a gaseous product comprising nitric oxide, unreacted nitrosyl chloride, and sulphur monochloride vapor, continuously withdrawing said gaseous product and cooling it to condense sulphur monochloride therefrom, and continuously introducing the resulting uncondensed gas comprising nitric oxide and unreacted nitrosyl chloride into contact at a temperature of about 25° C. with a liquid comprising essentially sulphur monochloride to absorb nitrosyl chloride from said uncondensed gas.

5. In a process for the production of nitric oxide from nitrosyl chloride, the step which comprises separating nitrosyl chloride from nitric oxide in a gaseous mixture of the same by contacting the gas containing nitric oxide and nitrosyl chloride with liquid sulphur monochloride which is substantially free from sulphur.

6. In a process for the production of nitric oxide from nitrosyl chloride, the step which comprises contacting a gaseous mixture of nitrosyl chloride and nitric oxide with liquid sulphur monochloride at about atmospheric temperature to remove nitrosyl chloride from the gas mixture by absorption.

7. A process for production of sulphur monochloride and nitric oxide which comprises introducing nitrosyl chloride into contact with a reactant comprising a solution of sulphur in sulphur monochloride, said reactant containing a greater molar proportion of sulphur monochloride than of sulphur, the molar proportion of sulphur being calculated on the basis of $S_8$ as the molecular formula for sulphur, and reacting said nitrosyl chloride with said dissolved sulphur to form sulphur monochloride and nitric oxide.

8. A process for production of sulphur monochloride and nitric oxide which comprises introducing nitrosyl chloride into contact with a reactant comprising a solution of sulphur in sulphur monochloride, said reactant containing a greater molar proportion of sulphur monochloride than of sulphur, the molar proportion of sulphur being calculated on the basis of $S_8$ as the molecular formula for sulphur, and reacting said nitrosyl chloride with the dissolved sulphur at a temperature in the range of about 25°–135° C. to form sulphur monochloride and nitric oxide.

9. A process for production of sulphur monochloride and nitric oxide which comprises introducing nitrosyl chloride into contact with a reactant comprising a solution of sulphur in sulphur monochloride, said reactant containing about 10% to 30% elemental sulphur and about 90% to 70% sulphur monochloride by weight, reacting said nitrosyl chloride with said dissolved sulphur at a temperature in the range of about 25°–135° C. to form a product comprising sulphur monochloride and nitric oxide, and separating sulphur monochloride and unreacted nitrosyl chloride from said nitric oxide.

WILLIAM C. KLINGELHOEFER.